(12) United States Patent
Tajima et al.

(10) Patent No.: US 9,429,190 B2
(45) Date of Patent: *Aug. 30, 2016

(54) TOLERANCE RING AND METHOD OF MANUFACTURING TOLERANCE RING

(75) Inventors: Norihiro Tajima, Kanagawa (JP); Michinobu Hirama, Kanagawa (JP); Atsushi Shitama, Kanagawa (JP)

(73) Assignee: NHK Spring Co., Ltd., Yokohama-shi (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/112,689

(22) PCT Filed: Apr. 20, 2012

(86) PCT No.: PCT/JP2012/060780
§ 371 (c)(1),
(2), (4) Date: Dec. 23, 2013

(87) PCT Pub. No.: WO2012/144628
PCT Pub. Date: Oct. 26, 2012

(65) Prior Publication Data
US 2014/0147199 A1    May 29, 2014

(30) Foreign Application Priority Data
Apr. 22, 2011 (JP) .................. 2011-096409

(51) Int. Cl.
| | |
|---|---|
| F16C 27/00 | (2006.01) |
| F16C 27/02 | (2006.01) |
| F16C 33/14 | (2006.01) |
| G11B 5/55 | (2006.01) |
| F16C 33/08 | (2006.01) |

(Continued)

(52) U.S. Cl.
CPC .............. *F16C 27/02* (2013.01); *F16C 27/04* (2013.01); *F16C 33/08* (2013.01); *F16C 33/14* (2013.01); *G11B 5/5569* (2013.01); *G11B 21/02* (2013.01); *F16C 17/02* (2013.01); *F16C 2370/12* (2013.01); *Y10T 29/49826* (2015.01); *Y10T 403/7058* (2015.01)

(58) Field of Classification Search
USPC ........ 403/365, 367, 371, 372; 384/535, 581; 360/265.2–265.6
See application file for complete search history.

(56) References Cited

U.S. PATENT DOCUMENTS 1,662,544 A * 3/1928 Solenberger .................. 277/485
3,061,386 A * 10/1962 Dix et al. ...................... 384/535

(Continued)

FOREIGN PATENT DOCUMENTS

| CN | 101911197 A | 12/2010 |
|---|---|---|
| CN | 102016337 A | 4/2011 |

(Continued)

OTHER PUBLICATIONS

International Search Report dated May 22, 2012, issued for PCT/JP2012/060780.

(Continued)

*Primary Examiner* — Victor Macarthur
(74) *Attorney, Agent, or Firm* — Locke Lord LLP

(57) ABSTRACT

A tolerance ring that has a ring shape approximately circling along a predetermined direction includes a plurality of projections, wherein the curvature radiuses of end portions in a circling direction are smaller than the curvature radius of a portion other than the end portions in the circling direction.

7 Claims, 9 Drawing Sheets

(51) Int. Cl.
*G11B 21/02* (2006.01)
*F16C 27/04* (2006.01)
*F16C 17/02* (2006.01)

(56) References Cited

U.S. PATENT DOCUMENTS

| | | | |
|---|---|---|---|
| 3,838,928 A | | 10/1974 | Blaurock et al. |
| 3,929,392 A | | 12/1975 | Ogino |
| 4,119,874 A | * | 10/1978 | Beavers et al. ............... 310/90 |
| 4,286,894 A | * | 9/1981 | Rongley ....................... 403/372 |
| 5,315,465 A | | 5/1994 | Blanks |
| 5,496,216 A | * | 3/1996 | Rohrle et al. ............... 464/66.1 |
| 5,601,370 A | | 2/1997 | Shibayama et al. |
| 6,288,878 B1 | | 9/2001 | Misso et al. |
| 2009/0297082 A1 | * | 12/2009 | Larue ........................... 384/536 |
| 2014/0161519 A1 | * | 6/2014 | Slayne et al. ................. 403/371 |

FOREIGN PATENT DOCUMENTS

| | | |
|---|---|---|
| DE | 4109481 A1 | 10/1992 |
| FR | 2175427 A5 | 10/1973 |
| FR | 2217585 A1 | 9/1974 |
| FR | 2674299 A1 | 9/1992 |
| JP | H05-106623 A | 4/1993 |
| JP | 05-205413 A | 8/1993 |
| JP | 08-028554 A | 2/1996 |
| JP | 2002-130310 A | 5/2002 |
| JP | 2003-522912 A | 7/2003 |
| JP | 2007-305268 A | 11/2007 |

OTHER PUBLICATIONS

The extended European search report dated Feb. 10, 2015 issued for corresponding European Patent Application No. 12773565.2.
Office action dated Apr. 22, 2015 issued for corresponding Chinese Patent Application No. 201280019776.7.

* cited by examiner

TOLERANCE RING AND METHOD OF MANUFACTURING TOLERANCE RING

FIELD

The present invention relates to a tolerance ring used for a hard disc device and the like and a method of manufacturing the tolerance ring.

BACKGROUND

Hard disc devices have been used in apparatuses performing information processing such as computers. Such hard disc devices have been used as external devices of computers, but are recently also mounted on home electric appliances, such as televisions and video recorders, and electronic devices for automobiles, A conventional hard disc device 200 illustrated in FIG. 14 houses a driving mechanism in a casing body 201. The driving mechanism includes hard discs 202 serving as recording media, a spindle 203 (this spindle is rotated by a motor, which is not illustrated) that rotates the hard discs 202, magnetic heads 204 that record information on and read out information from the hard discs 202, a carriage 205 that supports the magnetic heads 204 and turns above surfaces of the hard discs 202, a voice coil motor (VCM) 206 that causes the carriage 205 to turn precisely to control the magnetic head 204 to perform scanning, and a pivot shaft 207 that is fixed to the casing body 201 and is coupled to the carriage 205, The pivot shaft 207 has an approximately columnar shape, for example, and has a structure of a bearing.

The carriage 205 turns above the surfaces of the hard discs 202 with the center of the pivot shaft 207 as the center axis. For the fastening between the carriage 205 and the pivot shaft 207, a tolerance ring is used, for example. The fastening of the carriage 205 to the pivot shaft 207 prevents motive power of the VCM 206 for turning the carriage 205 from propagating to the casing body 201.

The tolerance ring has a ring shape formed from a platy member by being approximately circled along a predetermined direction. After the tolerance ring is inserted into an opening of the carriage 205, the pivot shaft 207 is pressingly fitted in the inside of the tolerance ring. As for such a tolerance ring, a tolerance ring having raised contact surfaces in a convex shape is disclosed (e.g., refer to Patent Literatures 1 and 2). A tolerance ring having an outer periphery in a corrugation shape is also disclosed (e.g., refer to Patent Literatures 3 and 4). In the tolerance rings described in Patent Literatures 1 to 4, the fastening between the carriage 205 and the pivot shaft 207 is made by pressingly making the raised contact surfaces or the projecting portions in the corrugation shape contact with a side surface of either the carriage 205 or the pivot shaft 207.

CITATION LIST

Patent Literature

Patent Literature 1: Japanese Patent Application Laid-open No. 5-205413
Patent Literature 2: Japanese Patent Application Laid-open No. 2003-522912
Patent Literature 3: Japanese Patent Application Laid-open No 2002-130310
Patent Literature 4: Japanese Patent Application Laid-open No. 2007-305268

SUMMARY

Technical Problem

The shapes along the circling directions of the conventional tolerance rings described in Patent Literatures 1 to 4 are elastically deformable to approximately circular shapes nearly equal to the openings of the carriages. In practice, however, the curvature radius of the tolerance ring is designed larger than the curvature radius of the opening of the carriage because the tolerance ring needs to be held inside the carriage for the sake of assembly operation. In addition, the curvature radiuses of end portions of the tolerance ring are larger than the curvature radius of the opening of the carriage in some cases because the end portion side of the tolerance ring is opened for the sake of manufacturing processes. As a result, the shape along the circling direction of the elastically deformed tolerance ring has an elliptical shape when the tolerance ring is inserted into the opening of the carriage. This results in the major axis of the ellipse being larger than the diameter of the opening of the carriage, and the tolerance ring may rub and damage the side surface of the carriage when being inserted into the opening of the carriage. As a result, the tolerance ring rubs and damages the inside of the hole of the carriage, and a problem arises in that this causes the occurrence of contamination. In addition, a problem arises in that it is difficult to pressingly fit the pivot shaft in the inside of the tolerance ring because the minor axis of the ellipse is too small with respect to the radius of the pivot shaft to provide a press-fit amount.

The present invention has been made in view of the above-mentioned circumstances and an object thereof is to provide a tolerance ring that enables a press-fit target to be readily pressingly fitted therein and also prevents the occurrence of contamination, and a method of manufacturing the tolerance ring.

Solution to Problem

To solve the problem described above and achieve the object, a tolerance ring according to the present invention has a ring shape approximately circling along a predetermined direction and includes a plurality of projections, wherein curvature radiuses of end portions in a circling direction are smaller than a curvature radius of a portion other than the end portions in the circling direction.

Moreover, in the above-described tolerance ring according to the present invention, the curvature radiuses are continuously reduced in directions from the portion other than the end portions to the end portions.

Moreover, in the above-described tolerance ring according to the present invention, the projections are arranged along the circling direction, and number of projections arranged in each row of the projections arranged along the circling direction is an even number.

Moreover, in the above-described tolerance ring according to the present invention, the number of projections arranged in each row is a multiple of three.

Moreover, a method of manufacturing a tolerance ring that is disposed between members serving as insertion targets and makes fastening between the members, according to the present invention, includes the steps of: forming a base material by shaping an outer shape of the tolerance ring coupled, through a runner, to a mother material that has a belt-like shape and is sequentially transferred; forming a projection on the base material formed at the step of forming the base material; curving the base material in a stepwise manner such that curvature radiuses of end portions in a circling direction of the base material on which the projection is formed are smaller than a curvature radius of a portion other than the end portions; and trimming the tolerance ring by cutting off the base material curved at the step of curving from the runner.

Advantageous Effects of Invention

The tolerance ring and the method of manufacturing the tolerance ring according to the present invention provide advantageous effects of enabling the press-fit target to be readily pressingly fitted in the tolerance ring and of preventing the occurrence of contamination because the curvature radiuses of both end portions in the circling direction are equal to the curvature radius of the opening of the coupling section of the carriage, and the curvature radius of the portion other than both end portions in the circling direction is larger than the curvature radius of the opening of the coupling section of the carriage.

DESCRIPTION OF EMBODIMENTS

The following describes embodiments of the present invention in detail with reference to the accompanying drawings. The present invention, however, is not limited to the following embodiments. The respective drawings referred to in the following description merely schematically illustrate the shapes, sizes, and positional relations to such degrees that the contents of the present invention are understandable. The present invention is not limited only to the shapes, sizes, and positional relations exemplified in the respective drawings. A hard disc device is described below for exemplarily explaining a tolerance ring.

Figure 1:
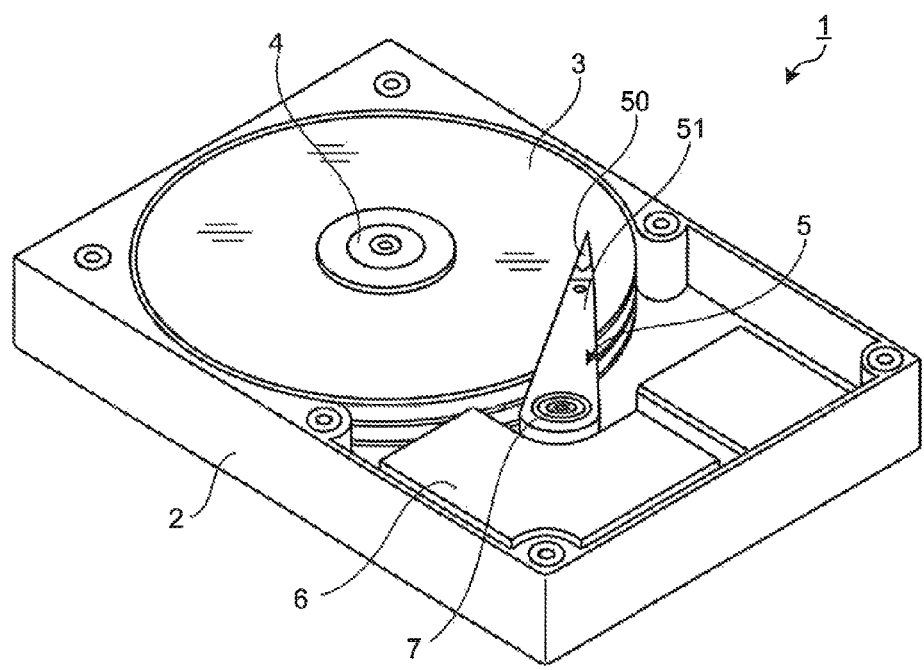
FIG. 1 is a perspective view illustrating a schematic structure of a hard disc device according to an embodiment of the present invention.

FIG. 1 is a perspective view illustrating a schematic structure of a hard disc device according to an embodiment of the present invention. A hard disc device 1 illustrated in FIG. 1 houses a driving mechanism in a casing body 2. The driving mechanism includes hard discs 3 serving as recording media, a spindle 4 that rotates the hard discs 3, magnetic head units 50 that record information in and read out information from the hard discs 3, a carriage 5 that supports the magnetic head units 50 and turns above surfaces of the hard discs 3, a VCM 6 that causes the carriage 5 to turn precisely to control the magnetic head units 50 to perform scanning, and a pivot shaft 7 that is fixed to the casing body 2 and is coupled to the carriage 5. The pivot, shaft 7 has an approximately columnar shape, for example, and has a structure of a bearing.

Figure 2:
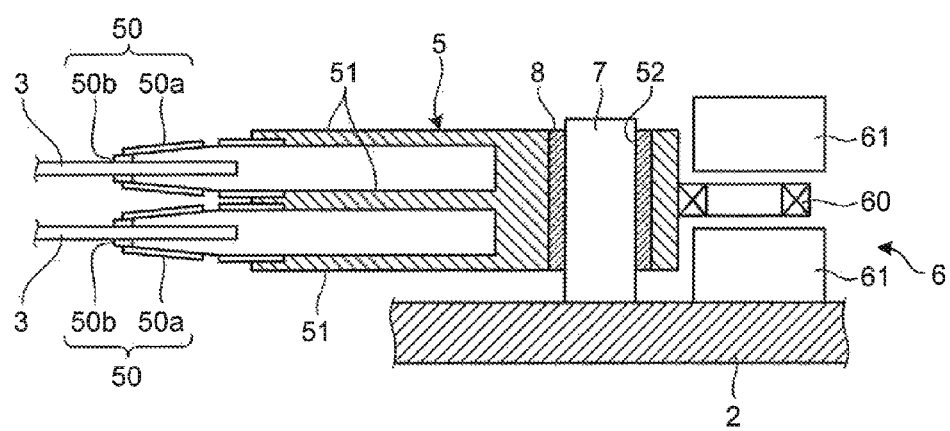
FIG. 2 is a partial cross-sectional view illustrating a structure of a main section of the hard disc device illustrated in FIG. 1.
Figure 3:
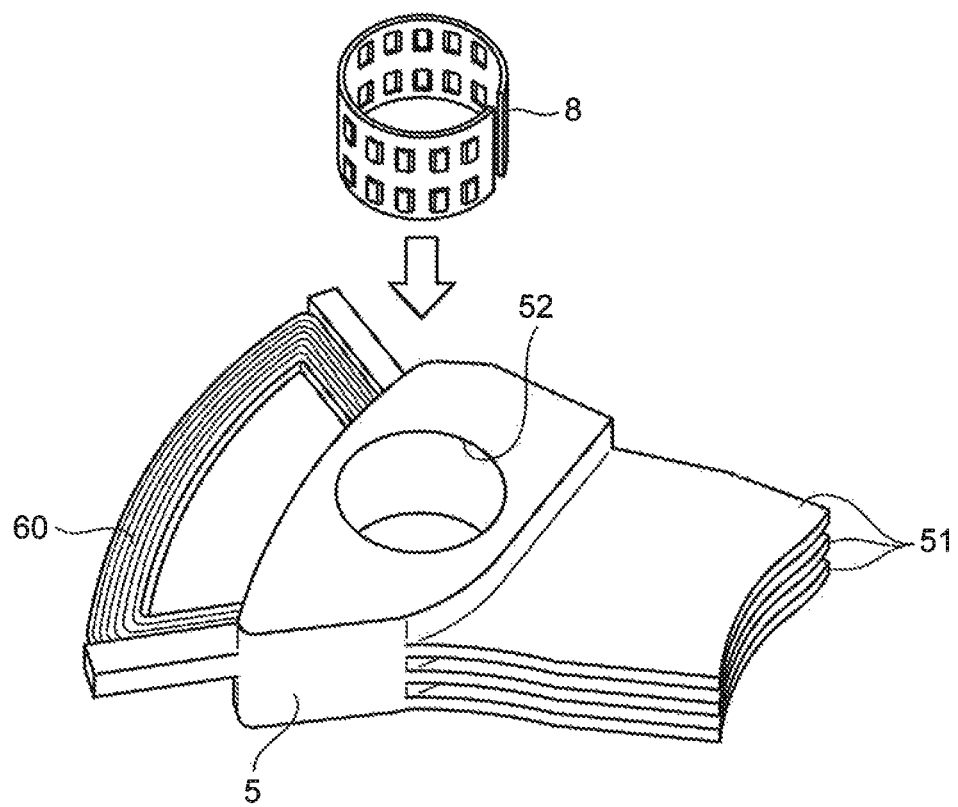
FIG. 3 is a perspective view illustrating the structure of the main section of the hard disc device illustrated in FIG. 1.

FIG. 2 is a partial cross-sectional view illustrating a structure of a main section of the hard disc device 1 illustrated in FIG. 1. FIG. 3 is a perspective view illustrating the structure of the main section of the hard disc device 1 illustrated in FIG. 1. The carriage 5 has arms 51 that extend above the surfaces of the hard discs 3 and support the magnetic head units 50 at their tips, and a coupling section 52 that is coupled to the pivot shaft 7, the cross-sectional surface of which has a columnar hollow space the cross-sectional surface of which is slightly larger than the diameter of the cross-sectional surface of the pivot shaft 7. As illustrated in FIG. 2, the magnetic head units 50 each have a suspension 50a floated with respect to the surfaces of the hard disc 3 by an air flow due to the rotation of the hard disc 3, and a magnetic head 50b that is provided at the tip of the suspension 50a on the side different from the side where the suspension 50a continues to the arm 51, and records information and reads out information.

The VCM 6 has a coil 60 coupled to the carriage 5 on the end side different from the side adjacent to the arms 51, and two magnets 61 interposing the coil 60 therebetween. The VCM 6 drives the carriage 5 using force generated by a current flowing in the coil 60 and a magnetic field. As a result, the carriage 5 turns above the surfaces of the hard discs 3 with the center of the pivot shaft 7 as the center axis by the motive power from the VCM 6 and causes the magnetic head units 50 to turn above the surfaces of the hard discs 3.

For the fastening between the carriage 5 and the pivot shaft 7, a tolerance ring 8 is used. The tolerance ring 8 is inserted into the hollow space of the coupling section 52 of the carriage 5 and then the pivot shaft 7 is pressingly fitted in the inside of the tolerance ring 8. As a result, the tolerance ring 8 makes the fastening between the carriage 5 and the pivot shaft 7. In the fastening, the carriage 5 is fixed so as to be able to turn about the center axis in the longitudinal direction of the pivot shaft 7, which is the bearing. The fastening of the carriage 5 to the pivot shaft 7 prevents motive power of the VCM 6 to turn the carriage 5 from propagating to the casing body 2.

Figure 4:
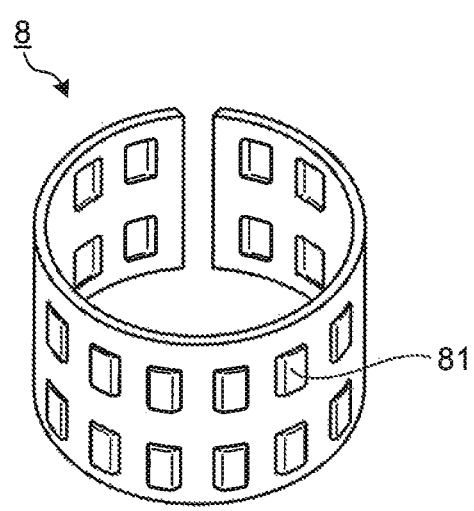
FIG. 4 is a perspective view illustrating a. structure of a tolerance ring of the hard disc device illustrated in FIG. 1.
Figure 5:
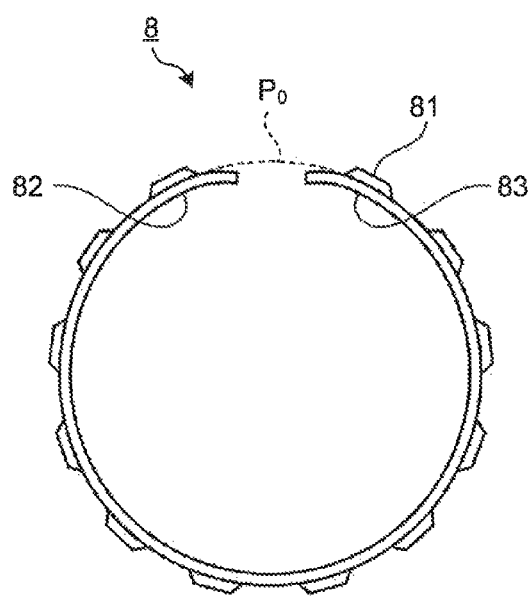
FIG. 5 is a side view illustrating the structure of the tolerance ring of the hard disc device illustrated in FIG. 1.

FIG. 4 is a perspective view illustrating the structure of the tolerance ring. FIG. 5 is a side view illustrating the structure of the tolerance ring. As illustrated in FIGS. 4 and 5, the tolerance ring 8 is formed using a platy stainless steel in. a ring shape approximately circling along a predetermined direction and provided with a plurality of projections 81. The projections 81 each project in the radial direction and on the outer surface of the tolerance ring 8 in an approximately rectangular shape. The projections 81 are provided along the circling direction of the tolerance ring 8 in two rows. After the tolerance ring 8 is inserted into an opening of the carriage 5, the pivot shaft 7 is pressingly fitted in the inside of the tolerance ring 8. In the press-fit, the projections 81 pressingly make contact with the inner wall of the coupling section 52 of the carriage 5, thereby making the fastening between the carriage 5 and the pivot shaft 207. The length of the tolerance ring 8 in the circling direction is preferably equal to the length of the outer periphery of the opening of the coupling section 52.

As illustrated in the side view of FIG. 5, the curvature radiuses of end portions 82 and 83 in the circling direction differ in value from the curvature radius of a portion other than the end portions 82 and 83 in the circling direction, in the tolerance ring 8. Specifically, the curvature radiuses of the end portions 82 and 83 in the circling direction are equal to the curvature radius of the coupling section. 52 of the carriage 5. The curvature radius of the portion other than the end portions 82 and 83 in the circling direction is larger than the curvature radius of the coupling section 52 of the carriage 5. In FIG. 5, a broken line $P_0$ indicates a circular shape, the curvature radius, of the portion other than the end portions 82 and 83 in the circling direction. This makes it possible for the tolerance ring 8 to be formed in a circular shape having a curvature radius nearly equal to the curvature radius of the coupling section 52 when the end portions 82 and 83, which provide an opening, approach to each other at the time of the insertion of the tolerance ring 8 into the coupling section 52 of the carriage 5. The tolerance ring 8 is curved such that curvature radiuses are continuously reduced in the directions from the portion other than the end portions 82 and 83 to the end portions 82 and 83.

Figure 6:
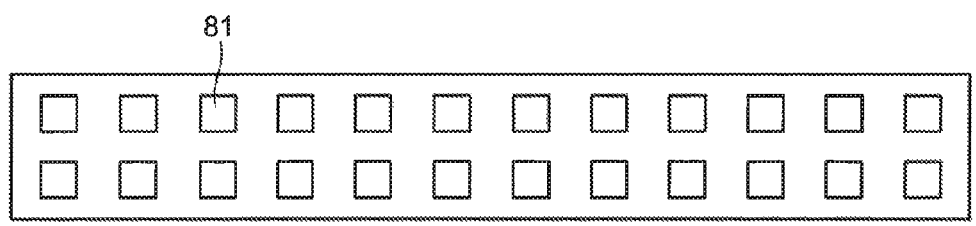
FIG. 6 is a schematic diagram illustrating the structure of the tolerance ring of the hard disc device illustrated in FIG. 1.

FIG. 6 is a schematic diagram illustrating the tolerance ring 8, which is developed in the circling direction, of the hard disc device 1 according to the embodiment. In the embodiment, the description is made on the basis of the assumption that 12 projections 81 are arranged in each row. As illustrated in FIG. 6, the projections 81 of the tolerance ring 8 are arranged in two rows along the longitudinal direction of a principal surface. The number of projections 81 arranged in each row is an even number and a multiple of three. The projections 81 evenly arranged in an even number prevents the projection 81 from being disposed at the position halving the tolerance ring 8 along the circling direction in manufacturing of the tolerance ring 8, thereby making it easy for the tolerance ring 8 to be curved and to be manufactured in a desired R shape. The projections 81 arranged in a multiple of three enables the projections 81 to make contact with the contacting side surface such that they have 120-degree rotational symmetry and to approximately uniform a load applied to the side surface of the coupling section 52, thereby making it possible to maintain operating efficiency of the bearing at high accuracy. In contrast, the disposition of the projection at the point halving the tolerance ring along the circling direction (the number of projections 81 arranged in each row is an odd number) increases stiffness of a region of the projection located at the curved portion to generate springback by reactive force in the direction opposite the curved direction, thereby making it difficult to form a desired R shape.

In the tolerance ring 8 according to the embodiment described above, the curvature radiuses of the end portions 82 and 83 in the circling direction are equal to the curvature radius of the coupling section 52 of the carriage 5, and the curvature radius of the portion other than the end portions 82 and 83 in the circling direction is larger than the curvature radius of the coupling section 52 of the carriage 5. This thus enables the tolerance ring 8 to be held inside the coupling section 52 and the shape of the tolerance ring 8 in the circling direction to be a circular shape along the wall surface of the coupling section 52 when the tolerance ring 8 is inserted into the coupling section 52 of the carriage 5. As a result, the tolerance ring 8 can be inserted into the coupling section 52 of the carriage 5 without damaging the wall surface of the coupling section 52. This can prevent the occurrence of contamination due to the insertion of the tolerance ring.

In the conventional tolerance ring, the side surface of the pivot shaft makes contact with the inner periphery of the tolerance ring on the minor axis side of the elliptical shape, whereby the inner periphery of the tolerance ring and/or the side surface of the pivot shaft are damaged when the pivot shaft or the like is pressingly fitted in the inside of the tolerance ring because the shape along the circling direction has an elliptical shape when inserting the tolerance ring into the coupling section. This may cause the occurrence of contamination. In contrast, the shape along the circling direction of the tolerance ring according to the embodiment has a circular shape along the wall surface of the coupling section 52, thereby enabling the tolerance ring to be inserted into the coupling section 52 without damaging the wall surface of the coupling section 52. In addition, the pivot shaft 7 can be pressingly fitted in the tolerance ring 8 without damaging the inner periphery of the tolerance ring 8 and/or the side surface of the pivot shaft. This can prevent the occurrence of contamination due to the tolerance ring.

As described above, the tolerance ring 8 according to the embodiment enables the pivot shaft 7 to be readily pressingly fitted in the inside of the tolerance ring 8 and the fastening between the carriage 5 and pivot shaft 7 to be reliably made by the projections 81 pressingly making contact with the wall surface of the coupling section 52.

Although it is described that the number of projections 81 arranged in each row is an integer, which is an even number and a multiple of three, the conditions of the number may be limited only to an even number. Although, it is described that the projections each have an approximately rectangular shape projected from the outer surface, the outer edge shape in the projecting direction. may be an approximately circular shape or the outer edge shape of the region projected from the outer surface may be an approximately circular shape if the number of the projections satisfies the conditions described above and the shape is capable of making the fastening between the members. It is described that the projections 81 are arranged in two rows along the circling direction of the tolerance ring 8. The arrangement, however, is not limited to this manner. They may be arranged in a single row or multiple rows.

It is described that the tolerance ring is curved such that the curvature radiuses are reduced continuously (in a multistep manner) in directions from the portion other than end portions to the end portions 82 and 83. The tolerance ring, however, may be curved in two steps of the curvature radiuses of the end portions and the curvature radius of the portion other than the end portions.

Figure 7:
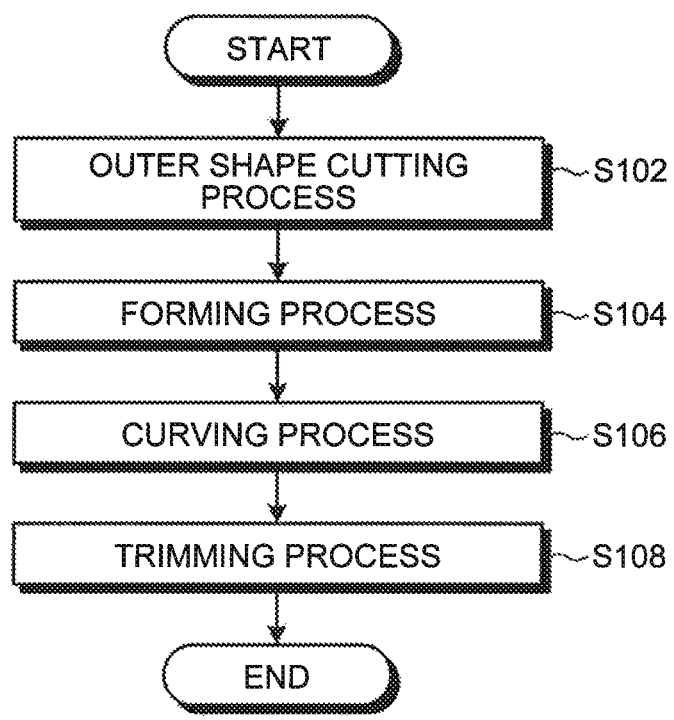
FIG. 7 is a flowchart illustrating an example of a method of manufacturing the tolerance ring according to another embodiment of the present invention.
Figure 8:
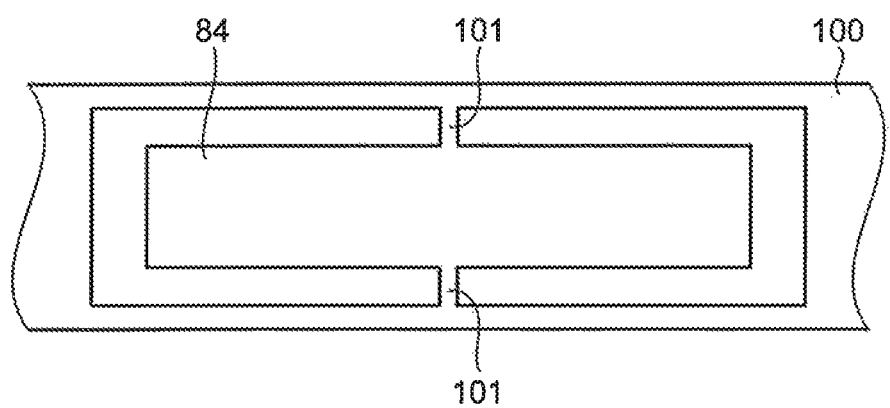
FIG. 8 is a schematic diagram explaining the manufacturing process illustrated in FIG. 7.

FIG. 7 is a flowchart illustrating an example of a method of manufacturing the tolerance ring according to another embodiment of the present invention. FIGS. 8 to 12 are schematic diagrams explaining the manufacturing processes illustrated in FIG. 7. First, outer shape cutting processing is performed on a mother material 100 extending in a platy shape by stamping (step S102: an outer shape cutting process). As illustrated in FIG. 8, the outer shape (outer edge) of the tolerance ring 8 is shaped by the outer shape cutting process and a base material 84 having the outer shape of the tolerance ring 8 is formed. Runners 101 maintain a coupling condition between the base material 84 and the mother material 100 so as to prevent the base material 84 from coming off from the mother material 100.

Figure 9:
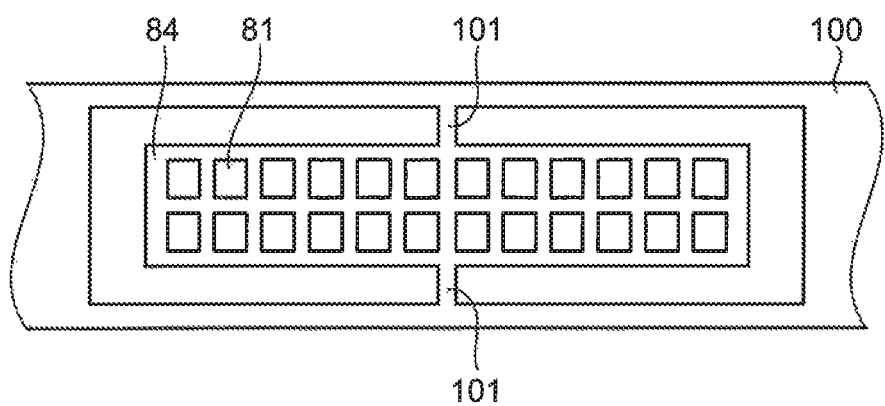
FIG. 9 is a schematic diagram explaining the manufacturing process illustrated in FIG. 7.
Figure 10:
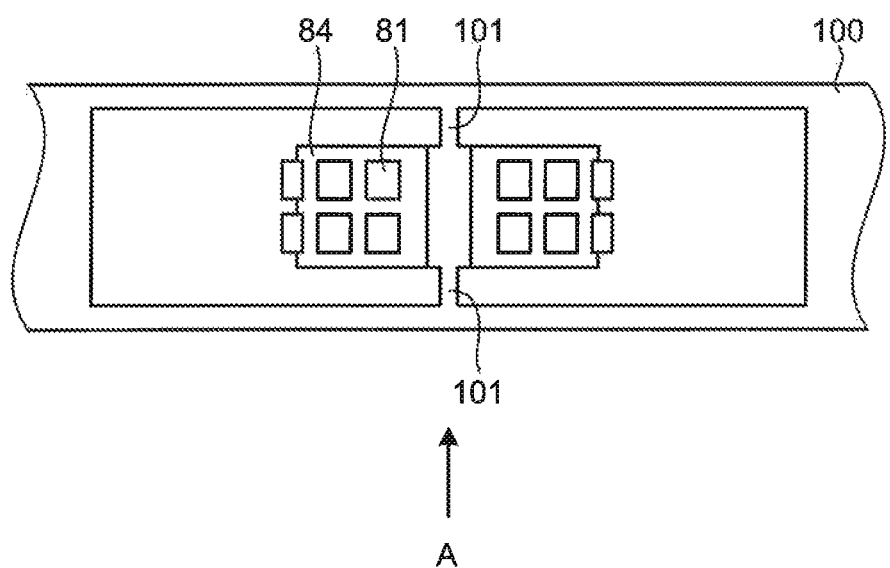
FIG. 10 is a schematic diagram explaining the manufacturing process illustrated in FIG. 7.

Forming processing of the projections 81 is then performed on the base material 84 formed at step S102 (step S104: a forming process). As illustrated in FIG. 9, the respective projections 81 are formed at the positions described above by press forming. The projections 81 are formed such that they protrude on the rear side of FIG. 9.

Figure 11:
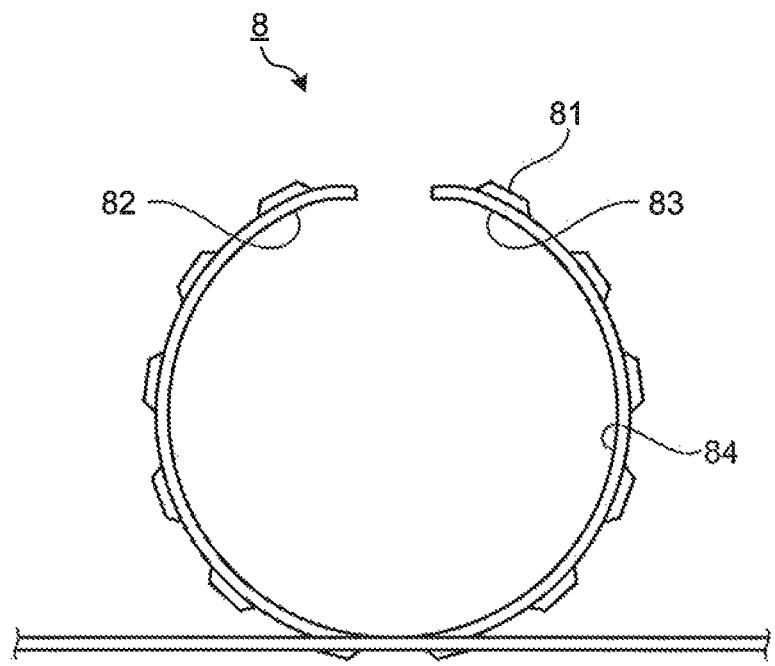
FIG. 11 is a schematic diagram explaining the manufacturing process illustrated in FIG. 7.
Figure 12:
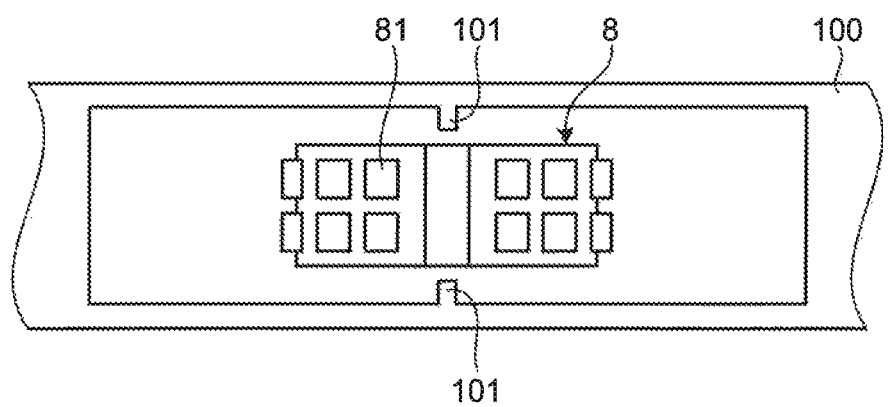
FIG. 12 is a schematic diagram explaining the manufacturing process illustrated in FIG. 7.

Subsequently, curving processing is performed on the base material 84 on which the projections 81 are formed at step S104 (step S106: a curving process). FIG. 11 is a schematic diagram of the base material 84 illustrated in FIG. 10 as viewed from an arrow A direction. In the curving process, the base material 84 is curved in a stepwise manner from both ends along the longitudinal direction of the principal surface of the base material 84 such that the projections 81 are arranged on the outer surface side, and the curvature radiuses of the end portions 82 and 83 in the circling direction are formed smaller than the curvature radius of the portion other than the end portions 82 and 83 in the circling direction (refer to FIGS. 10 and 11). The base material 84 is preferably curved such that curvature radiuses are reduced continuously (in a multistep manner) in the directions from the portion other than the end portions 82 and 83 to the end portions 82 and 83.

Upon completion of the curving process at step S106, trimming processing is performed (step S108: a trimming process). As illustrated in FIG. 11, the tolerance ring 8 is obtained by cutting off the base material 84 from the runners 101. After the trimming process, processing (setting treatment) to apply a stress equal to or larger than a maximum working stress may be performed on the projections 81 of the resulting tolerance ring 8. The setting treatment is preferably performed in a state before the base material 84 is curved and between the forming process of the projections 81 at step 8104 and the curving process at step S106.

Figure 13:
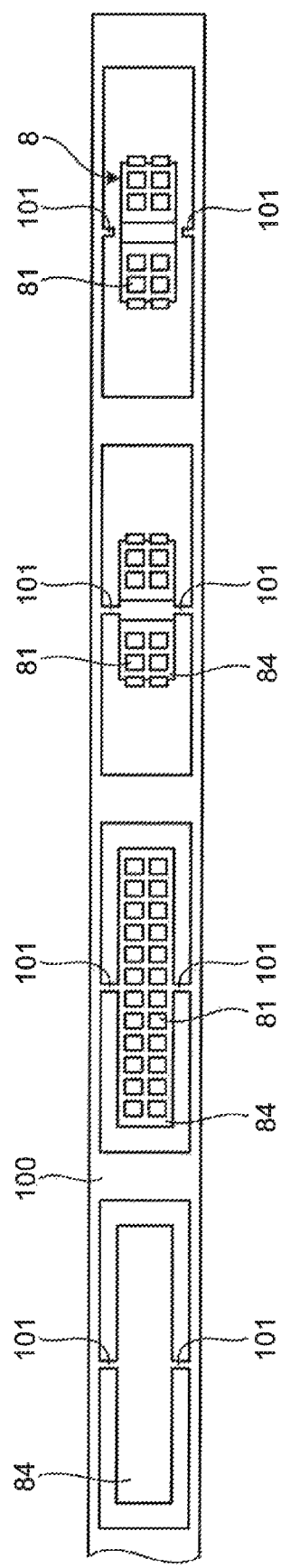
FIG. 13 is a schematic diagram illustrating the method of manufacturing the tolerance ring according to the embodiment of the present invention.
Figure 14:
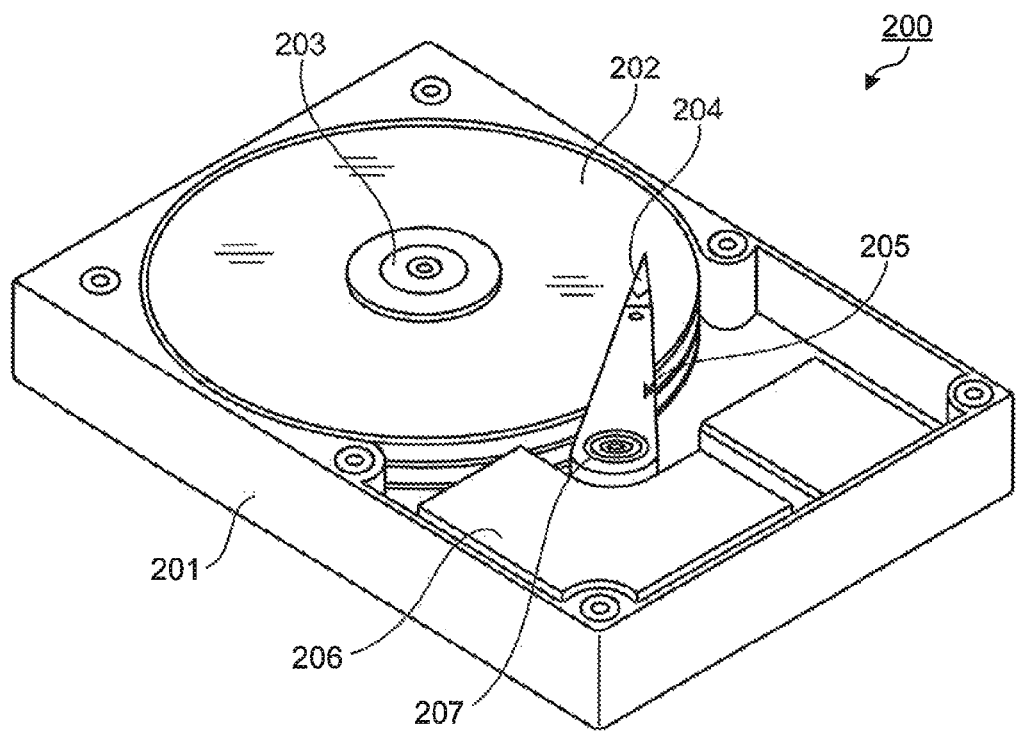
FIG. 14 is a perspective view illustrating a schematic structure of a hard disc device according to the prior art.

The method of manufacturing the tolerance ring described above can be achieved by transfer pressing in which the processes described above are sequentially performed on the mother material 100 extending in a belt like shape as illustrated in FIG. 13. This makes it possible to efficiently manufacture the tolerance rings 8 using a single apparatus.

INDUSTRIAL APPLICABILITY

As described above, the tolerance ring and the method of manufacturing the tolerance ring according to the present invention enable the press-fit target to be readily pressingly fitted in the tolerance ring and are also effective for preventing the occurrence of contamination.

REFERENCE SIGNS LIST 1, 200 hard disc device
2, 201 casing body
3, 202 hard disc
4, 203 spindle
5, 205 carriage
6, 206 VCM
7, 207 pivot shaft
8 tolerance ring
50 magnetic head unit
50a suspension
50b, 204 magnetic head
51 arm
52 coupling section
60 coil
61 magnet
81 projection
82, 83 end portion
100 mother material
101 runner

The invention claimed is:

1. A tolerance ring comprising:
   a ring shape approximately circling along a predetermined direction; and
   a plurality of projections, wherein
   curvature radiuses of end portions in a circling direction are smaller than a curvature radius of a portion other than the end portions in the circling direction,
   the curvature radiuses of end portions are adapted to be equal to a curvature radius of a coupling section connecting different parts,
   a curvature radius of the portion other than the end portions in the circling direction is larger than the curvature radius of the coupling section, and
   the tolerance ring is adapted to be inserted into the coupling section and adapted to deform when inserted into the coupling section.

2. The tolerance ring according to claim 1, wherein the curvature radiuses are continuously reduced in directions from the portion other than the end portions to the end portions.

3. The tolerance ring according to claim 2, wherein
   the projections are arranged along the circling direction, and
   number of projections arranged in each row of the projections arranged along the circling direction is an even number.

4. The tolerance ring according to claim 3, wherein the number of projections arranged in each row is a multiple of three.

5. The tolerance ring according to claim 1, wherein
   the projections are arranged along the circling direction, and
   number of projections arranged in each row of the projections arranged along the circling direction is an even number.

6. The tolerance ring according to claim 5, wherein the number of projections arranged in each row is a multiple of three.

7. A combination of a tolerance ring and a coupling section, comprising:
   the tolerance ring being inserted into the coupling section connecting different parts, the tolerance ring comprising:
      a ring shape approximately circling along a predetermined direction; and
      a plurality of projections, wherein
   curvature radiuses of end portions in a circling direction are smaller than a curvature radius of a portion other than the end portions in the circling direction,
   the curvature radiuses of end portions are substantially equal to a curvature radius of the coupling section, and
   a curvature radius of the portion other than the end portions in the circling direction is larger than the curvature radius of the coupling section, and
   the tolerance ring deforms when inserted into the coupling section.

* * * * *